United States Patent [19]

Benier

[11] 4,286,939

[45] Sep. 1, 1981

[54] DOUGH ROUNDER WITH ADJUSTABLE ROUNDING BOWLS

[75] Inventor: Johan Benier, Vught, Netherlands

[73] Assignee: Benier B.V., Ketelaarskampweg, Netherlands

[21] Appl. No.: 168,391

[22] Filed: Jul. 10, 1980

[30] Foreign Application Priority Data

Jul. 16, 1979 [NL] Netherlands ........................ 7905535

[51] Int. Cl.³ ............................ B29B 1/02; B29B 1/04
[52] U.S. Cl. ................................................. 425/333
[58] Field of Search ......................................... 425/333

[56] References Cited

U.S. PATENT DOCUMENTS

| 854,308 | 5/1907 | Petri | 425/333 |
|---|---|---|---|
| 1,163,814 | 12/1915 | Eckel | 425/333 |
| 1,178,726 | 4/1916 | Janggen | 425/333 |
| 1,192,973 | 8/1916 | Allison | 425/333 |
| 1,817,643 | 8/1931 | Petri . | |
| 2,119,018 | 5/1938 | Marasso | 425/333 |
| 2,165,495 | 7/1939 | Marasso | 425/333 |
| 2,623,478 | 12/1952 | Verheij | 425/333 |
| 2,693,155 | 11/1954 | Bay | 425/333 |
| 3,899,275 | 8/1975 | Atwood | 425/333 |

FOREIGN PATENT DOCUMENTS

| 1198753 | 4/1966 | Fed. Rep. of Germany . | |
|---|---|---|---|
| 1782185 | 7/1971 | Fed. Rep. of Germany . | |
| 621549 | 5/1927 | France | 425/333 |
| 7019062 | 7/1972 | Netherlands . | |
| 28456 | of 1913 | United Kingdom . | |

Primary Examiner—W. E. Hoag
Attorney, Agent, or Firm—Brumbaugh, Graves, Donohue & Raymond

[57] ABSTRACT

A dough rounding machine provided with a vertical rounding drum and with a trough extending helically or spirally about the drum, said trough being composed of a bottom and a bowl spaced apart from the drum, while the bottom comprises flat bottom plate sections successive in helical direction, abutting the drum and attached to a frame surrounding the drum, while the bowl is composed of bowl sections likewise successive in helical direction and fixable on the bottom plate sections with variable distance to the drum, whereby each bowl section is designed as a wall plate which, with a bottom edge that completely abuts the bottom plate section, is movable over the bottom plate section towards and away from the drum with maintenance of said abutment.

4 Claims, 3 Drawing Figures

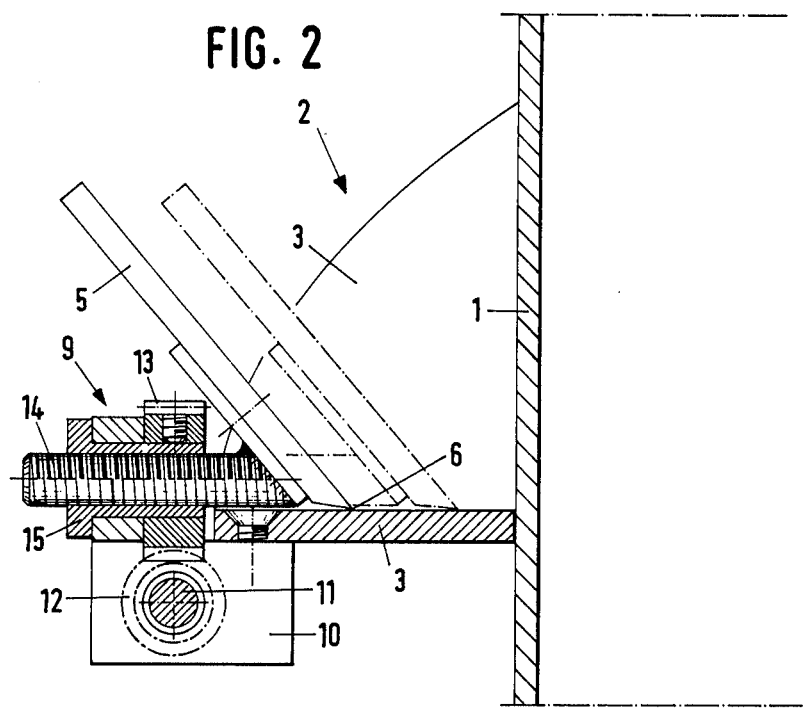
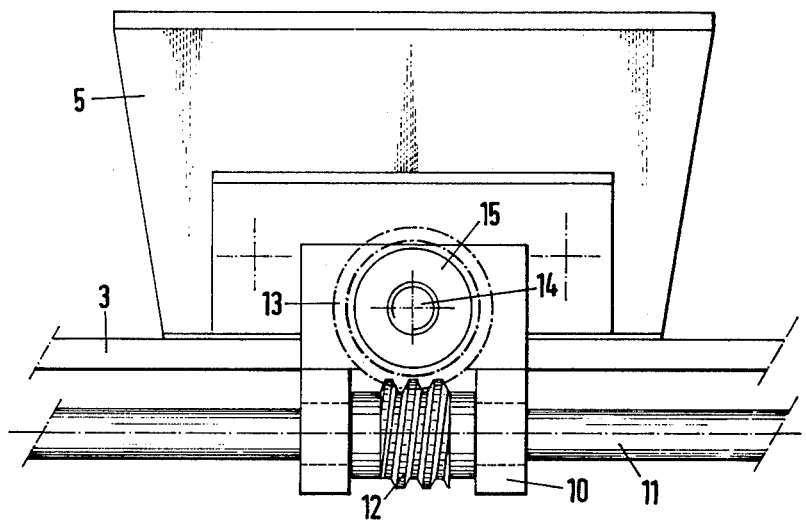

DOUGH ROUNDER WITH ADJUSTABLE ROUNDING BOWLS

The invention relates to a rounder of the type provided with a rounding up drum rotatable about a substantially vertically oriented axis and furthermore fitted with a trough extending spirally or helically about the drum, composed of a bottom and a bowl spaced apart from said drum, while the bottom comprises helically successive plate sections adjoining the drum and attached to a drum-surrounding frame, while the bowl is composed of likewise helically successive bowl sections fixable on the bottom plate sections with variable distance to the drum.

Such adjustable bowls for a dough rounder having a cylindrical rounding up drum are described in British patent 28456 AD 1912. The purpose thereof is to vary the size and/or the shape of the trough in order to adjust the trough to different dough ball dimensions and-/or dough types. In this prior art apparatus each bottom plate section has the configuration of a part of a helix and carries a bowl section of substantially the same dimension and which has likewise a helical design. A drawback thereof is that when changing the radial distance from a bowl to the drum surface, the connection of the bottom edge of the bowl to the bottom plate section is lost, which is inconvenient. Since during the rounding up, on a piece of dough, frictional forces are exerted with a downwardly oriented component, dough would therefore like to escape along the drum and underneath the bowl wall. This is prevented in the drum in that the bottom plate sections closely fit to the drum, however, leakage of dough adjacent the bowl wall cannot be avoided if said abutment of bowl wall on bottom wall is lacking locally.

It is the object of the invention to avoid this drawback.

To this effect according to the invention each bottom plate section is flat while each bowl section is designed as a wall plate which, with a bottom edge entirely abutting the bottom plate section, is slidable towards and away from the drum over the bottom plate section with maintenance of said abutment.

A further drawback of the prior art apparatus is that the sections each extend through 90°, so that in case of substantial narrowing of the trough the difference in radius of curvature between bowl section and drum wall leads to inadmissible fluctuations.

As a result it is impossible in such a rounder to handle small pieces of dough, e.g. for fancy rolls, buns and the like. For such small dough balls it was hitherto necessary to use an entirely different type of rounder in which each time a charge of dough balls is positioned on a bearing surface, while the cup-shaped rounding-up chamber is lowered over each dough ball, while said chamber is moved over the bearing surface in a closed path. After the rounding up it is necessary in such a continuously operating machine to discharge pieces of dough, to apply a new charge, etc.

According to the invention this drawback can be eliminated and the apparatus can be made suitable for handling dough balls of widely varying sizes, by applying according to the invention a relatively large number of bowl wall sections, e.g. at a drum diameter of less than 100 cm each bowl wall section has to extend through at most approximately 70°.

Another drawback of the prior art apparatus wherein the bowls are attached to the bottom plates by means of screws, clamps and the like, is that the modification of the trough width is time-consuming and moreover requiring skilled personnel. In a bakery, however, each day mostly different batces for baking different types of bread are handled, e.g. a batch of dough balls for breads of 800 grams, subsequently for breads of 500 grams and dough balls of very slight weight, e.g. 20 grams for fancy rolls. Therefore there is a need for a simple and rapid adjustability of the rounding trough width.

For this purpose according to the invention the wall plates may be displaceable separately or groupwise by means of a right-angled transmission towards and away from the drum by at least one driving element extending along the bottom plate sections supporting the respective wall plates. The driving element may be operative mechanically or hydraulically on wedge constructions which ensure radial displacement of the wall plates.

In an embodiment of the invention the driving element may be a flexible, rotatable shaft, which at each wall plate is provided with a worm, while each wall plate is fitted with a screwed spindle which is drivable by the shaft through a worm-engaging worm wheel.

In such a construction, adjacent the shaft drive, there may be arranged an indicator connected therewith, which correlates the shaft rotation with the position of the wall plates, respectively with the type of bread or the weight of the dough balls with which the adjusted trough width corresponds.

One embodiment of the dough rounder with adjustable rounding-up bowls according to the invention will now be described, by way of example, with reference to the accompanying drawings.

FIG. 2 is a side view, partly in cross-section, of the attachment of a wall plate; and FIG. 3 is a end view of the wall plate according to FIG. 2.

Figure 1:
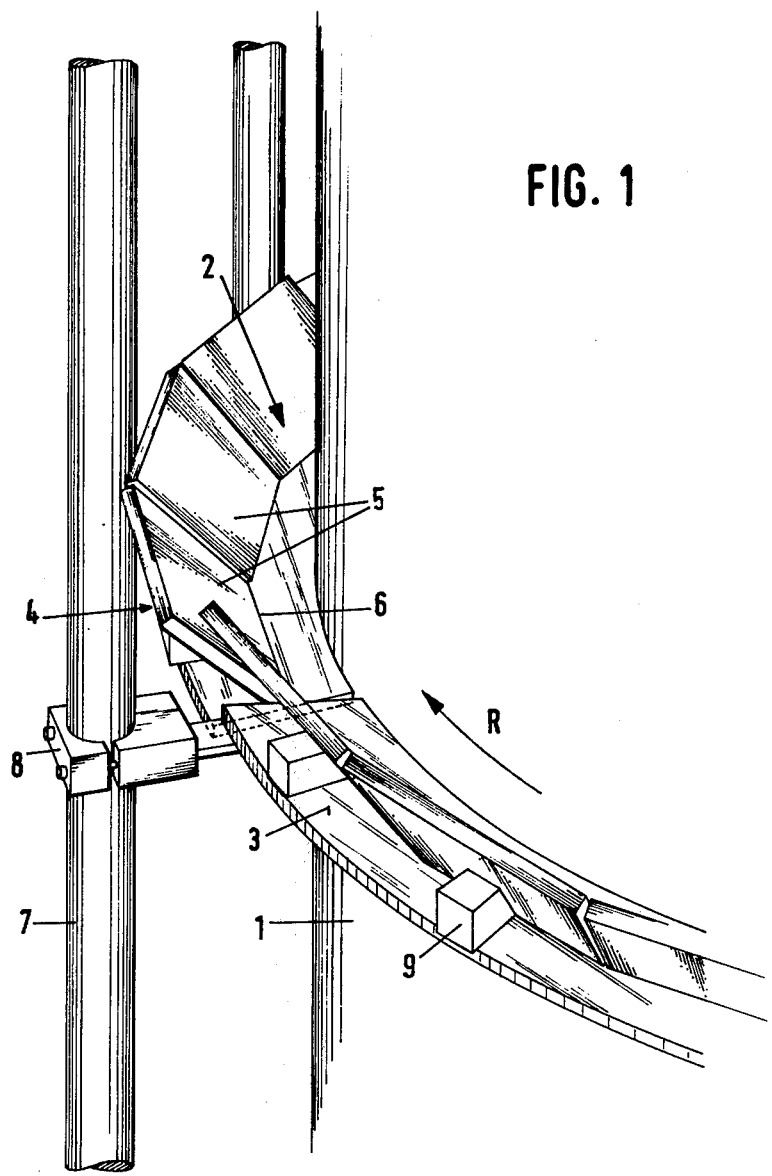
FIG. 1 is a detailed perspective view of the rounder.

According to the drawing, in particular FIG. 1, the rounder is fitted with a drum 1 rotatable about a vertical shaft in the arrow direction F. Around the drum 1 there extends helically a rounding-up trough 2 which is bounded besides by the drum 1 by a series of bottom plates 3 and a bowl wall 4 composed of successive bowl wall sections or wall plates 5. Each of the wall plates 5 has a bottom edge 6 abutting the bottom plate 3 and which is arranged substantially tangentially relative to the oppositely disposed drum surface. The trough elements 2 and 3 are attached to a frame 7 disposed about the drum 1 by means of attachment clamps 8. Each bottom plate 3 carries a plurality of wall plates 5 which, by means of a mechanism generally indicated in FIG. 1 by numeral 9, are movable individually or group-wise towards and away from the drum for varying the width of the trough 2.

In the embodiment shown in FIGS. 2 and 3, a bearing 10 is mounted on each bottom plate 3 for a flexible shaft 11 extending along a plurality of bottom plates 3, preferably all bottom plates 3, which shaft adjacent each wall plate 5 is fitted with a worm 12 which is in engagement with a worm wheel 13. The rotation transmitted by the flexible shaft 11 through the worm 12 onto the worm wheel 13 is transmitted onto a threaded spindle 14 by means of a lead screw nut 15. The threaded spindle 14 is affixed to the wall plate 5, possibly via a connection (not shown) enabling adjustment of the inclination of the wall plates 5.

By rotating the flexible shaft 11, therefore all interconnected wall plates 5 are moved simultaneously towards the drum 1 or away therefrom. Thus the width of the trough 2 can be rapidly and simply modified without requiring skilled personnel for this purpose.

It will be clear that the invention is not restricted to the above described embodiment. For instance the rounding-up trough 2 may be applied with a drum that has not the cylinder configuration shown in the drawing but the conical configuration likewise frequently applied for rounding-up drums. Also the shape of the wall plates 5 may be modified according to requirements and instead of worm-worm wheel transmissions also hydraulic transmissions, wedge constructions and the like may be utilized. Essential is that the trough width is controllable from one point, whereby the rounding-up bowls are movable towards and away from the drum with maintenance of the abutment of the wall plates to the bottom plates.

What I claim is:

1. A dough rounding machine provided with a rounding drum which is rotatable about a substantially vertically oriented axis and furthermore being provided with a trough extending helically or spirally about the drum, said trough consisting of a bottom and a bowl spaced apart from the drum, said bottom comprising plate sections successive in helical direction, abutting the drum and attached to a frame surrounding the drum, while the bowl consists of bowl sections likewise successive in helical direction and fixable on the bottom plate sections with variable distance to the drum, characterized in that each bottom plate section is flat and each bowl section is designed as a wall plate which, with a bottom edge completely abutting the bottom plate section, is movable over the bottom plate section towards and away from the drum with maintenance of said abutment.

2. An apparatus according to claim 1, characterized in that at a drum diameter of less than 100 cm, each bowl wall section extends through at most approximately 70°.

3. An apparatus according to claim 1 or 2, characterized in that the wall plates each separately or groupwise are movable towards and away from the drum by means of a right-angled transmission by at least one driving element extending along the bottom plate sections supporting the respective wall plates.

4. An apparatus according to claim 3, characterized in that the driving element is a flexible, rotatable shaft which adjacent each wall plate is provided with a worm and each wall plate is fitted with a threaded spindle which is drivable by the shaft through a wormengaging worm wheel.

* * * * *